United States Patent
Marchesani et al.

(10) Patent No.: US 6,208,698 B1
(45) Date of Patent: Mar. 27, 2001

(54) QUADRATURE MODULATOR IMBALANCE ESTIMATOR AND MODULATOR STAGE USING IT

(75) Inventors: Rossano Marchesani, Chieti (IT); Jean-Xavier Canonici, Neuilly (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 08/956,443

(22) Filed: Oct. 23, 1997

(30) Foreign Application Priority Data

Oct. 24, 1996 (FR) .................................................. 96 12977

(51) Int. Cl.[7] ................................................... H04L 27/36
(52) U.S. Cl. ........................ 375/298; 375/235; 375/295; 375/296; 332/103
(58) Field of Search ..................... 375/298, 296, 375/200, 295, 235; 332/103; 381/13

(56) References Cited

U.S. PATENT DOCUMENTS

| | | | |
|---|---|---|---|
| 4,771,464 | * 9/1988 | Kadin et al. | 381/13 |
| 4,930,141 | * 5/1990 | Ohmagari | 375/296 |
| 5,208,830 | * 5/1993 | Cornec et al. | 375/200 |
| 5,293,406 | * 3/1994 | Suzuki | 375/295 |
| 5,663,691 | * 9/1997 | Kowalik et al. | 332/103 |

FOREIGN PATENT DOCUMENTS

| | | |
|---|---|---|
| 4445823A1 | 6/1995 | (DE) . |
| 0503588A2 | 9/1992 | (EP) . |
| 0617532A1 | 9/1994 | (EP) . |
| 2729261A1 | 7/1996 | (FR) . |

OTHER PUBLICATIONS

A. Lohtia et al, "An Adaptive Digital Technique for Compensating for Analog Quadrature Modulator/Demodulator Impairments", Proceedings of the Pacific Rim Conference on Communications, Comput and Signal Processing, Victoria, May 19–21, 1993, vol. 2 of 2, May 19, 1993, Institute of Electrical and Electronics Engineers, pp. 447–450 XP000419312.

* cited by examiner

Primary Examiner—Stephen Chin
Assistant Examiner—Shuwang Liu
(74) Attorney, Agent, or Firm—Sughrue, Mion, Zinn, Macpeak & Seas, PLLC

(57) ABSTRACT

An imbalance estimator for quadrature modulators comprising two mixers to which are applied two carrier signals and to each of which is applied a modulating signal, output signals of said mixers being applied to a combiner to constitute a modulated signal, detects the instantaneous power of the modulated signal. The detected instantaneous power is multiplied by the modulating signals, and the resulting signals are rectified. The rectified signals are rectified to supply signals indicative of the imbalance of the modulator.

20 Claims, 3 Drawing Sheets

QUADRATURE MODULATOR IMBALANCE ESTIMATOR AND MODULATOR STAGE USING IT

BACKGROUND OF THE INVENTION

1. Field of the Invention

The field of the invention is that of transmitters of signals with $2^n$ phase states obtained by phase shift keying with M states or by amplitude and phase modulation with M states.

The invention is more precisely concerned with a quadrature modulator imbalance estimator for modulators having two mixers to which two carrier signals are applied and to each of which a modulating signal is applied, the output signals of the mixers being applied to a combiner to constitute a modulated signal. The carrier signals are in phase quadrature and are at an intermediate frequency (IF modulation) or at a carrier frequency (direct modulation).

One aim of the invention is to provide an estimator that can be used in a control loop to modify the amplitude difference of the output signals of the mixers (balance estimator adapted to estimate the relative amplitude of two channels). The invention is of particular benefit in controlling a modulator stage operating in a wide band of frequencies.

2. Description of the Prior Art

European patent application No 0 503 588 describes a phase quadrature signal modulator imbalance estimator. The disadvantage of this estimator is that it requires the use of a learning sequence for estimating the imbalance and that the correction of the modulator is not adaptive.

French patent application No 2 729 261 also describes a quadrature modulator imbalance estimator.

In the above application, the quadrature modulator includes two mixers to which two carrier signals are applied and to each of which a modulating signal is applied, the output signals of the mixers being applied to a combiner to constitute a modulated signal.

The estimator includes:

means for detecting the instantaneous power of the modulated signal;

means for multiplying the detected instantaneous power by at least one of the modulating signals; and means for integrating the result of the above multiplication, the integrator means supplying a signal indicative of the modulator malfunction.

The defect estimated is either a quadrature defect or carrier residuals in the modulated signal.

When the malfunction of the modulator is a defect in respect of the phase quadrature relationship of the signals from the mixers, the multiplier means multiply the detected instantaneous power by the modulating signals to supply, after integration, a signal representative of the phase difference between the signals from the mixers.

When the malfunction of the modulator is carrier signal residuals in the modulated signal, the multiplier means multiply the instantaneous power by each of the modulating signals to supply, after integration, two signals representative of the carrier signal residuals in the modulated signal.

However, the above document does not propose any solution to the problem of correcting imbalance.

FIG. 1 shows a constellation of a four-state phase shift keyed signal from a modulator having an imbalance.

In the case of modulation with $2^n$ phase states, to obtain a Cartesian coordinate type representation in a signal space, the $2^n$ phase states can be uniformly distributed relative to axes corresponding to orthogonal carrier signals X and Y. There is then obtained a constellation that corresponds to the vector representation of the carrier signal states whose projections onto the X and Y axes give the coordinates of the end of the vector represented.

If the modulator has an imbalance, the constellation is as shown in FIG. 1 because of the amplitude difference between the X and Y channels. This degrades transmitter performance.

One object of the present invention is to overcome the above drawbacks.

To be more precise, one object of the invention is to provide a quadrature modulator imbalance estimator that can be used to correct the imbalance in an adaptive way. In particular, it must be possible to use the estimator in a quadrature modulator operating in a wide band of frequencies.

SUMMARY OF THE INVENTION

The above objects, and others that will emerge below, are achieved by a quadrature modulator imbalance estimator for modulators comprising two mixers to which are applied two carrier signals and to each of which is applied a modulating signal, output signals of said mixers being applied to a combiner to constitute a modulated signal, said estimator including:

means for detecting the instantaneous power of said modulated signal;

means for multiplying said detected instantaneous power by said modulating signals, said multiplier means supplying produced signals;

means for rectifying said produced signals; and means for integrating said rectified produced signals supplying signals indicative of said imbalance of said modulator.

The invention also concerns a quadrature modulator cooperating with an estimator of the above kind.

Other features and advantages of the invention will become apparent from a reading of the following description of two preferred embodiments given by way of illustrative and non-limiting examples and from the accompanying drawings.

DETAILED DESCRIPTION OF THE PREFERRED EMBODIMENTS

Figure 1:
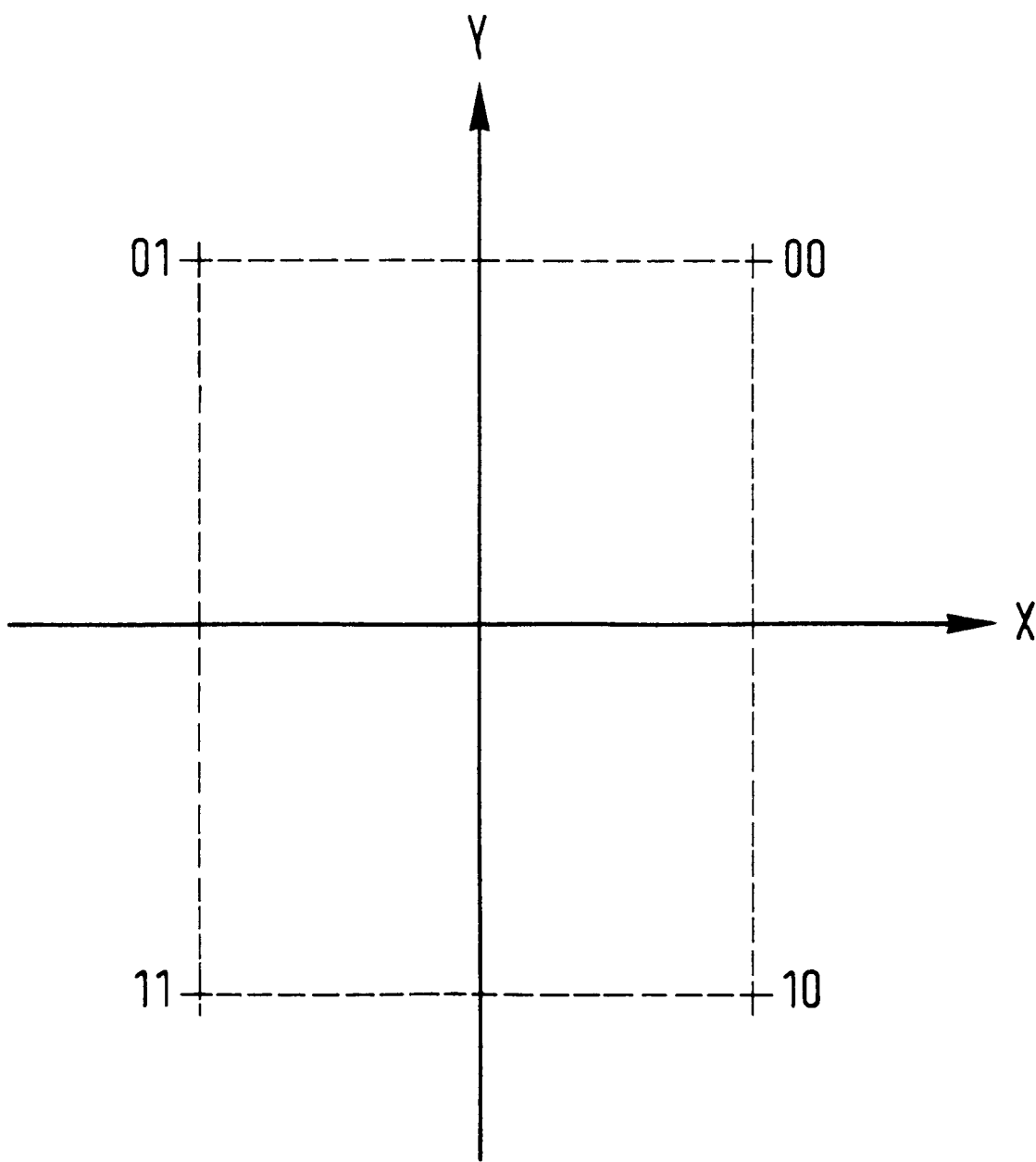
FIG. 1 represents a constellation of a four-state phase shift keyed signal from a modulator having an imbalance.

FIG. 1 has already been described with reference to the prior art.

Figure 2:
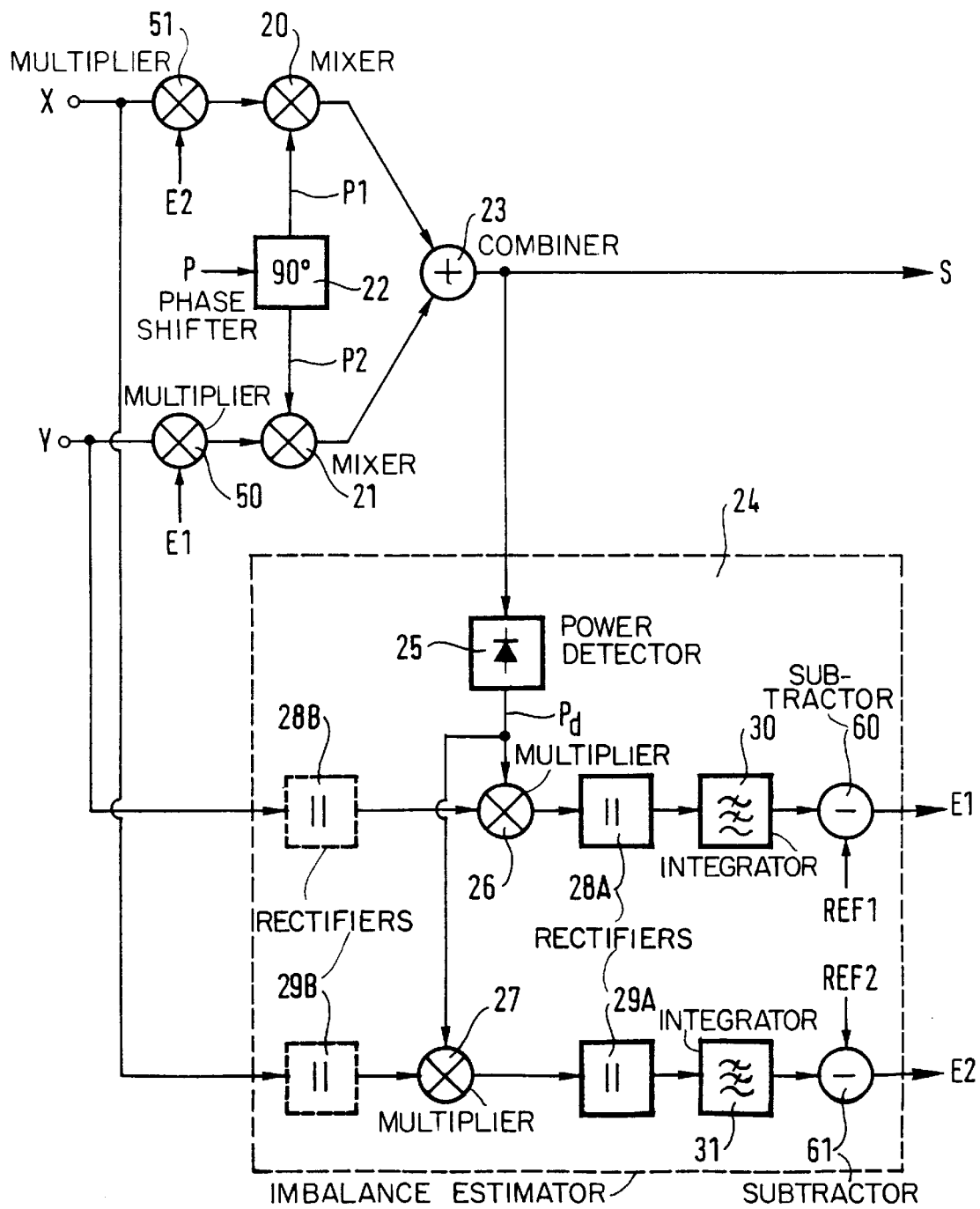
FIG. 2 shows a quadrature modulator controlled by an imbalance estimator of the invention.

FIG. 2 shows a quadrature modulator controlled by an imbalance estimator of the invention. Here the estimator is entirely analog.

The quadrature modulator shown includes, in the conventional way, two mixers 20, 21 to which are applied two carrier signals P1 and P2 derived from a carrier signal P obtained from a local oscillator and from a 90° phase-shifter 22. A modulating signal X, Y is applied to each of the mixers 20, 21 (via multipliers 50, 51 described below). The output signals of the mixers 20, 21 are applied to a combiner 23 to constitute a modulated signal S. The modulated signal S is either an intermediate frequency signal or a microwave frequency signal.

The estimator 24 of the invention includes:

means 25 for detecting the instantaneous power Pd of the modulated signal S;

means 26, 27 for multiplying the detected instantaneous power Pd by each of the modulating signals X, Y;

means 28A, 29A for rectifying the signals produced, which rectifier means can be diodes, for example; and means 30, 31 for integrating the rectified signals, the integrator means being followed by subtractors 60, 61 supplying respective signals E1 and E2 proportional to the amplitude of the modulator imbalance.

In a variant, the rectifier means 28A and 29A can respectively be replaced by means 28B and 29B for rectifying the signals X and Y applied to the estimator 24.

The subtractors 60 and 61 receive respective analog reference signals REF1 and REF2, which are usually identical (REF1=REF2), the output signals of the integrator means 30, 31 being subtracted from REF1 and REF2, respectively. For example, REF1 and REF2 are equal to twice the mean amplitude of the modulated signal S.

The subtractors 60 and 61 generally need to be used only for the purposes of correcting imbalance.

To correct an imbalance the signals E1 and E2 are respectively applied to the multipliers 50 and 51 on the input side of the mixers 21 and 20, respectively, to correct the offsets introduced by these mixers.

The signals E1 and E2 can instead be applied to subtractor means (not shown) supplying a signal E=E1−E2 (or E2−E1), this signal E also being indicative of the modulator imbalance. The signal E can be applied to a multiplier on the input side of one of the mixers 20, 21.

Figure 3:
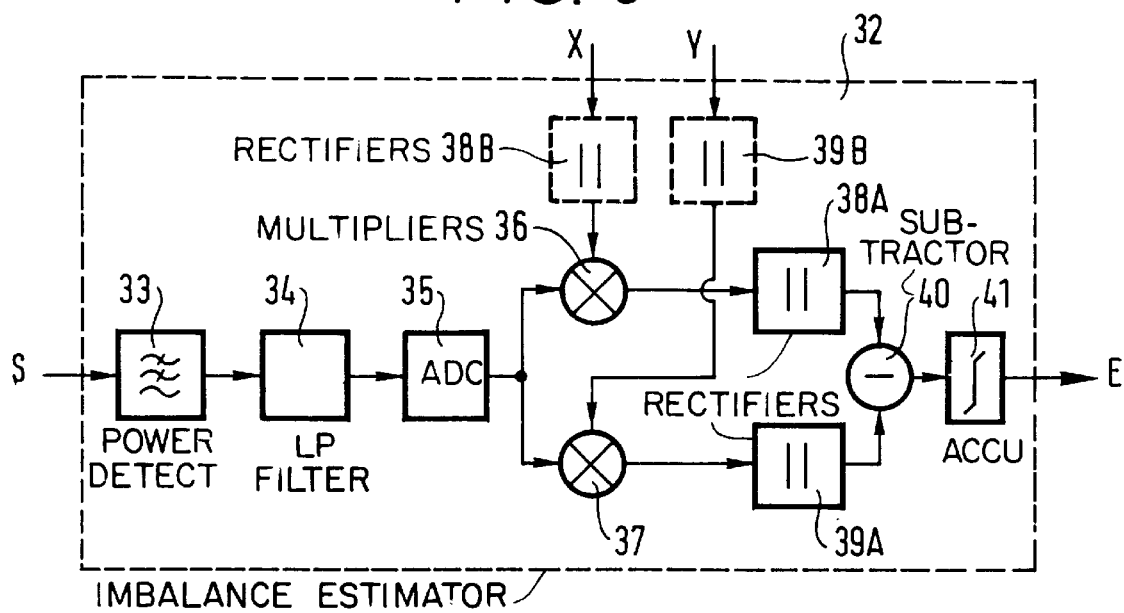
FIG. 3 shows another embodiment of an imbalance estimator of the invention.

FIG. 3 shows another embodiment of an imbalance estimator of the invention. In this embodiment the estimator 32 is essentially digital.

The modulated signal S from the quadrature modulator is applied to means 33 for detecting the instantaneous power of the modulated signal S. The detector means supply the envelope of the modulated signal S to a low-pass filter 34 followed by an analog-digital converter 35 operating at a frequency equal to n/Ts, where Ts is the signal period and n is at least equal to 2. The digitized envelope is applied to multiplier means 36, 37 also receiving the modulating signals X and Y. The signals produced are applied to absolute value circuits 38A, 39A constituting means for rectifying the signals produced. The signals output by the circuits 38A, 39A are applied to a subtractor 40 and the resulting difference signal is applied to accumulator means 41 supplying a signal E indicative of the modulator imbalance. of course, the signals output by the absolute value circuits 38A and 39A could instead be accumulated without being subtracted, the results of such accumulation then constituting two imbalance estimate signals each applied to one mixer of the quadrature modulator.

As previously, a variant replaces the rectifier means 38A and 39A with rectifier means 38B and 39B operating directly on the modulating signals X and Y applied to the estimator 32.

Figure 4:
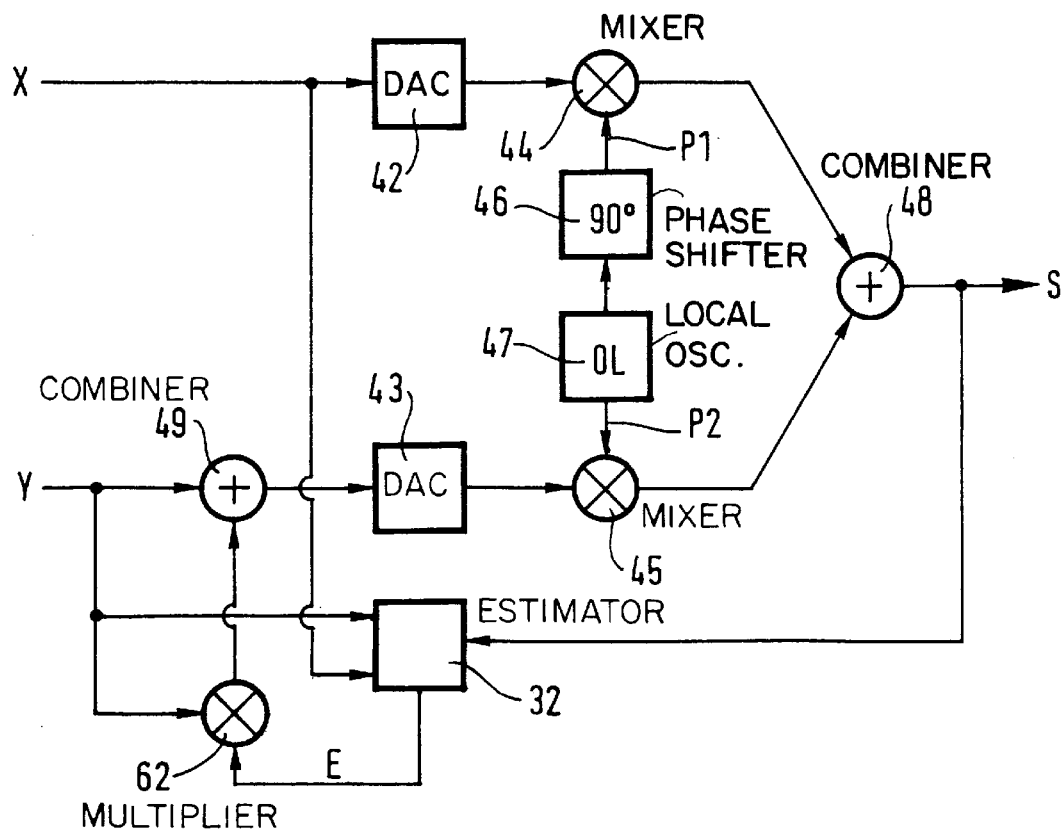
FIG. 4 shows another quadrature modulator that can be controlled by an imbalance estimator.

The aforementioned signal E can be used to correct the quadrature modulator as explained below with reference to FIG. 4, which shows another quadrature modulator that can be controlled by an imbalance estimator.

In this figure, the modulating signals X and Y are conventionally applied to a modulator stage comprising digital-analog converters (DAC) 42, 43 whose output signals are applied to mixers 44, 45 receiving carrier signals P1, P2 in phase quadrature. The carrier signals P1 and P2 are obtained by applying a 900 phase-shift to the output signal of a local oscillator 47 using a phase-shifter 46. The output signals of the mixers 44, 45 are added in a combiner 48 to constitute a modulated signal S that can be transmitted.

The quadrature modulator cooperates with the estimator 32 receiving the modulating signals X and Y and the modulated signal S. The estimator 32 supplies the signal E relating to the modulator imbalance, this signal E being applied to a multiplier 62 receiving one of the modulating signals (here the signal Y), the output signal of this multiplier 62 being added to this modulating signal (combiner 49).

The estimators described above are more particularly intended to be associated with a modulator stage operating with a variable digital bit rate and a variable carrier signal frequency. Of course, they are also of great benefit in the case of a modulator operating at a fixed frequency, being used to compensate variations in the characteristics of the modulator due to temperature variations or to ageing, for example.

The invention applies to modulators used in microwave or satellite transmission, for example.

What is claimed is:

1. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

means for detecting an instantaneous power of said modulated signal;

means for multiplying said detected instantaneous power by said modulating signals, said multiplying means supplying produced signals;

means for rectifying said produced signals; and means for integrating said rectified produced signals, supplying signals indicative of an amplitude imbalance of said modulator.

2. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

means for detecting an instantaneous power of said modulated signal;

means for multiplying said detected instantaneous power by absolute values of said modulating signals, said multiplying means supplying rectified produced signals; and means for integrating said rectified produced signals, thereby supplying signals indicative of an amplitude imbalance of said modulator.

3. The estimator claimed in claim 1 wherein said signals supplied by said integrating means are applied to subtractor means supplying a signal indicative of said amplitude imbalance of said modulator.

4. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

means for detecting an instantaneous power of said modulated signal;

means for multiplying said detected instantaneous power by said modulating signals, said multiplying means supplying produced signals;

means for rectifying said produced signals; and means for integrating a difference between said rectified produced signals, thereby supplying a single signal indicative of an amplitude imbalance of said modulator.

5. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

means for detecting an instantaneous power of said modulated signal;

means for multiplying said detected instantaneous power by absolute values of said modulating signals, said multiplying means supplying rectified produced signals; and means for integrating a difference between said rectified produced signals, thereby supplying a single signal indicative of an amplitude imbalance of said modulator.

6. A quadrature modulator adapted to cooperate with an estimator as claimed in claim 1.

7. A quadrature modulator adapted to cooperate with an estimator as claimed in claim 2.

8. A quadrature modulator adapted to cooperate with an estimator as claimed in claim 3.

9. A quadrature modulator adapted to cooperate with an estimator as claimed in claim 4.

10. A quadrature modulator adapted to cooperate with an estimator as claimed in claim 5.

11. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

a power detector for detecting an instantaneous power of said modulated signal;

at least one multiplier for multiplying said detected instantaneous power by said modulating signals, said at least one multiplier supplying produced signals;

a rectifier for rectifying said produced signals; and an integrator for integrating said rectified produced signals, supplying signals indicative of an amplitude imbalance of said modulator.

12. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

a detector detecting an instantaneous power of said modulated signal;

a multiplier multiplying said detected instantaneous power by absolute values of said modulating signals, said multiplier supplying rectified produced signals; and an integrator integrating said rectified produced signals, thereby supplying signals indicative of an amplitude imbalance of said modulator.

13. The estimator claimed in claim 11 wherein said signals supplied by said integrator are applied to a subtractor supplying a signal indicative of said amplitude imbalance of said modulator.

14. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

a detector detecting an instantaneous power of said modulated signal;

at least two multipliers multiplying said detected instantaneous power by respective ones of said modulating signals, said multipliers supplying produced signals;

at least two rectifiers rectifying said produced signals; and an integrator integrating a difference between said rectified produced signals, thereby supplying a single signal indicative of an amplitude imbalance of said modulator.

15. An imbalance estimator for a quadrature modulator comprising two mixers, to which are respectively applied two carrier signals, and to which are respectively applied modulating signals, output signals of said mixers being applied to a combiner to constitute a modulated signal, said estimator including:

a detector detecting an instantaneous power of said modulated signal;

at least two multipliers multiplying said detected instantaneous power by absolute values of respective ones of said modulating signals, said multipliers supplying rectified produced signals; and an integrator integrating a difference between said rectified produced signals, thereby supplying a single signal indicative of an amplitude imbalance of said modulator.

16. A quadrature modulator adapted to cooperate with an estimator as claimed in claim 11.

17. A quadrature modulator adapted to cooperate with an estimator as claimed in claim 12.

18. A quadrature modulator adapted to cooperate with an estimator as claimed in claim 13.

19. A quadrature modulator adapted to cooperate with an estimator as claimed in claim 14.

20. A quadrature modulator adapted to cooperate with an estimator as claimed in claim 15.

* * * * *